(12) United States Patent
Yoshioka

(10) Patent No.: US 8,408,187 B2
(45) Date of Patent: Apr. 2, 2013

(54) CONTROL APPARATUS AND CONTROL METHOD FOR INTERNAL COMBUSTION ENGINE

(75) Inventor: Mamoru Yoshioka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 849 days.

(21) Appl. No.: 12/519,828

(22) PCT Filed: Dec. 21, 2007

(86) PCT No.: PCT/IB2007/004046
§ 371 (c)(1),
(2), (4) Date: Jun. 18, 2009

(87) PCT Pub. No.: WO2008/081283
PCT Pub. Date: Jul. 10, 2008

(65) Prior Publication Data
US 2010/0024785 A1    Feb. 4, 2010

(30) Foreign Application Priority Data
Dec. 21, 2006    (JP) ................................ 2006-344322

(51) Int. Cl.
*F02B 33/00* (2006.01)
(52) U.S. Cl. .................................. 123/559.1; 123/90.15
(58) Field of Classification Search ................ 123/559.1, 123/90.15
See application file for complete search history.

(56) References Cited

U.S. PATENT DOCUMENTS

| | | | | |
|---|---|---|---|---|
| 4,996,966 A * | 3/1991 | Hitomi et al. | ............... | 123/559.3 |
| 5,090,391 A | 2/1992 | Sasaki et al. | | |
| 5,230,320 A * | 7/1993 | Hitomi et al. | ............... | 123/559.1 |
| 5,239,960 A | 8/1993 | Sasaki et al. | | |
| 5,396,874 A * | 3/1995 | Hitomi et al. | ............... | 123/559.1 |
| 5,421,296 A * | 6/1995 | Hitomi et al. | ............. | 123/184.53 |
| 5,421,308 A | 6/1995 | Hitomi et al. | | |
| 5,427,078 A * | 6/1995 | Hitomi et al. | ............... | 123/559.1 |
| 7,357,103 B2 * | 4/2008 | Koopmans | ................... | 123/27 R |
| 2005/0000480 A1 * | 1/2005 | Yasui et al. | ................ | 123/90.16 |
| 2006/0272623 A1 | 12/2006 | Pagot | | |

FOREIGN PATENT DOCUMENTS

| | | |
|---|---|---|
| DE | 43 09 627 | 2/1994 |
| EP | 0 392 330 | 10/1990 |
| JP | 2 241937 | 9/1990 |
| JP | 3 26816 | 2/1991 |
| JP | 5 86951 | 4/1993 |

(Continued)

*Primary Examiner* — Thomas Denion
*Assistant Examiner* — Patrick Maines
(74) *Attorney, Agent, or Firm* — Oblon, Spivak, McClelland, Maier & Neustadt, L.L.P.

(57) ABSTRACT

A control apparatus for an internal combustion engine including a supercharging device, which includes: a valve-drive mechanism that variably controls the valve timings for at least intake valves; a target valve timing setting mechanism setting a target valve timing for at least the intake valves in accordance with an operation condition of the engine in a low engine speed range; and a valve-drive mechanism controller controlling the valve-drive mechanism based on the target valve timing. Each of the target valve timings is differently set such that (a) a valve-overlap duration is provided in a negative pressure region; (b) the valve-overlap duration in the negative pressure region is made shorter in a first supercharging region; and (c) the valve-overlap duration in the first supercharging region is made longer in a second supercharging region where the higher load of the engine is required.

15 Claims, 7 Drawing Sheets

FOREIGN PATENT DOCUMENTS

| | | |
|---|---|---|
| JP | 5 296070 | 11/1993 |
| JP | 6 21579 | 3/1994 |
| JP | 6 173723 | 6/1994 |
| JP | 10 274064 | 10/1998 |
| JP | 2003 83134 | 3/2003 |
| JP | 2004 218522 | 8/2004 |
| JP | 2005 30335 | 2/2005 |
| JP | 2005 188286 | 7/2005 |

* cited by examiner

| kl\NE | 1000 | 2000 | 3000 | 4000 | 5000 | 6000 |
|---|---|---|---|---|---|---|
| 20 | 0 | 0 | 3 | 5 | 5 | 5 |
| 40 | 5 | 10 | 13 | 15 | 15 | 15 |
| 60 | 10 | 15 | 20 | 20 | 20 | 20 |
| 80 | 15 | 20 | 25 | 25 | 25 | 25 |
| 100 | 20 | 25 | 35 | 35 | 30 | 30 |
| 120 | 25 | 30 | 35 | 35 | 25 | 25 |
| 140 | 20 | 25 | 25 | 15 | 5 | 0 |

FIG.7

| kl \ NE | 1000 | 2000 | 3000 | 4000 | 5000 | 6000 |
|---|---|---|---|---|---|---|
| 20 | 0 | 0 | 0 | 0 | 0 | 0 |
| 40 | 0 | 0 | 0 | 0 | 0 | 0 |
| 60 | 0 | 0 | 0 | 0 | 0 | 0 |
| 80 | 10 | 15 | 10 | 0 | 0 | 0 |
| 100 | 20 | 20 | 15 | 0 | 0 | 0 |
| 120 | 25 | 25 | 15 | 0 | 0 | 0 |
| 140 | 20 | 20 | 10 | 0 | 0 | 0 |

FIG.8

| NE | 1000 | 2000 | 3000 | 4000 | 5000 | 6000 |
|---|---|---|---|---|---|---|
| vvtwot | 20 | 30 | 25 | 15 | 5 | 0 |

CONTROL APPARATUS AND CONTROL METHOD FOR INTERNAL COMBUSTION ENGINE

BACKGROUND OF THE INVENTION

1. Field of the Invention

The invention relates to a control apparatus and control method for an internal combustion engine having a supercharging device.

2. Description of the Related Art

For example, Japanese patent application publication No. 05-296070 describes an apparatus that the time period during which both the intake valve and the exhaust valve are open (hereinafter, referred to as "valve-overlap duration") is reduced when the engine is operating in a supercharging region at a low engine speed. This apparatus is equipped with a variable valve timing mechanism and controls the closing valve timing of the intake valves in a low engine speed range to be retarded as compared in a high engine speed range. Generally, because the valve-overlap duration is longer in a low engine speed range than in a high engine speed range, the injected fuel in the low engine speed range may partially flow out to the exhaust ports without being combusted (this will be referred to as "outflow of injected fuel" where necessary). Particularly, the outflow of injected fuel may show up in engines having a supercharger. Therefore, by reducing the valve-overlap duration in the low engine speed range, the fluctuation of air-fuel ratio due to the outflow of injected fuel may be suppressed accordingly, which improves the fuel efficiency.

However, if the valve timing for closing the intake valves is retarded in order to reduce the valve overlap duration in the low engine speed range, the intake air in the cylinder may flow back into the intake port (this will be referred to as "backflow of intake air" where necessary) because the inertia force of the intake air is weak in the low engine speed range. Thus, the packing efficiency of intake air in the cylinder may decrease, and thereby the engine output may decrease particularly when the engine load is high.

SUMMARY OF THE INVENTION

The invention provides a control apparatus and control method for an internal combustion engine having a supercharging device, which suppresses the amount of harmful exhaust emissions while ensuring the engine output when the engine load is high while the low engine speed range is low.

The first aspect of the invention relates to a control apparatus for an internal combustion engine having a supercharging device, which includes; a valve-drive mechanism that variably controls a valve timing for at least intake valves; target valve timing setting means for setting a target valve timing for at least the intake valves in accordance with an operation condition of the engine in a low engine speed range; and valve-drive mechanism controlling means for controlling the valve-drive mechanism based on the target valve timing. The target valve timing setting means sets: (a) a first target valve timing such that a valve-overlap duration during which both the intake valve and an exhaust valve are open, is provided when the engine is operating in a negative pressure region where the supercharging device is not being driven; (b) a second target valve timing such that the valve-overlap duration in the negative pressure region is made shorter when the engine is operating in a first supercharging region of supercharging regions where the supercharging device is being driven; and (c) a third target valve timing such that the valve-overlap duration in the first supercharging region is made longer when the engine is operating in a second supercharging region where the higher load of the engine is required as compared in the first supercharging region.

The target valve timing setting means may set the first target valve timing in the negative pressure region such that the valve-overlap duration is made longer as the required load of the engine increases.

The first target valve timing in the negative pressure region may be advanced to make the valve-overlap duration longer as the required load of the engine increases.

The engine may be determined to be operating in the supercharging regions when the pressure in an intake passage of the engine is positive.

Alternatively, the engine may be determined to be operating in the supercharging regions when a load rate of the engine exceeds a first reference value.

The target valve timing setting means may set the second target valve timing in the first supercharging region such that the valve-overlap duration is made shorter as the engine speed is decreased.

The control apparatus may further include: second supercharging region determining means for determining that the engine is operating in the second supercharging region when at least an opening degree of a throttle valve in the engine is greater than a second reference value; and second reference value calculating means for calculating the second reference value such that the second reference value is made smaller as the engine speed is decreased.

The engine may be determined to be operating in the second supercharging region when an approximate full load of the engine is required.

The control apparatus may further include: actual valve timing obtaining means for obtaining an actual valve timing of al least the intake valves in the supercharging regions; air-fuel ratio learning control means for executing (a) an air-fuel ratio feedback control based on a deviation between a target air-fuel ratio and an actual air-fuel ratio, thereby causing the air-fuel ratio of air-fuel mixtures which are supplied to the engine to be equal to the target air-fuel ratio, and (b) an air-fuel ratio learning process for minimizing an error of the air-fuel ratio during the air-fuel ratio feedback control; and air-fuel ratio learning prohibiting means for prohibiting the execution of the air-fuel ratio learning process when a deviation between the target valve timing and the actual valve timing exceeds a predetermined amount.

The valve-drive mechanism may be a variable valve timing mechanism.

Alternatively, the valve-drive mechanism may be a solenoid valve mechanism.

The second aspect of the invention relates to a control method for an internal combustion engine having a supercharging device and a valve-drive mechanism that variably controls the valve timings for at least intake valves, which includes the steps of: setting a target valve timing for at least the intake valves in accordance with an operation condition of the engine in a low engine speed range; and controlling the valve-drive mechanism based on the target valve timing. The control method further includes: (a) setting a first target valve timing such that a valve-overlap duration during which both the intake valve and an exhaust valve are open, is provided when the engine is operating in a negative pressure region where the supercharging device is not being driven; (b) setting a second target valve timing such that the valve-overlap duration in the negative pressure region is made shorter when the engine is operating in a first supercharging region of supercharging regions where the supercharging device is being driven; and (c) setting a third target valve timing such that the valve-overlap duration in the first supercharging region is made longer when the engine is operating in a second supercharging region where the higher load of the engine is required as compared in the first supercharging region.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 7 is a table according to which a VVT retardation amount, which is set so as to suppress the backflow of intake air, is calculated using the engine load rate and the engine speed as parameters;

FIG. 8 is a table according to which a WOT required VVT value is calculated using the engine speed as a parameter.

DETAILED DESCRIPTION OF EMBODIMENTS

Figure 1:
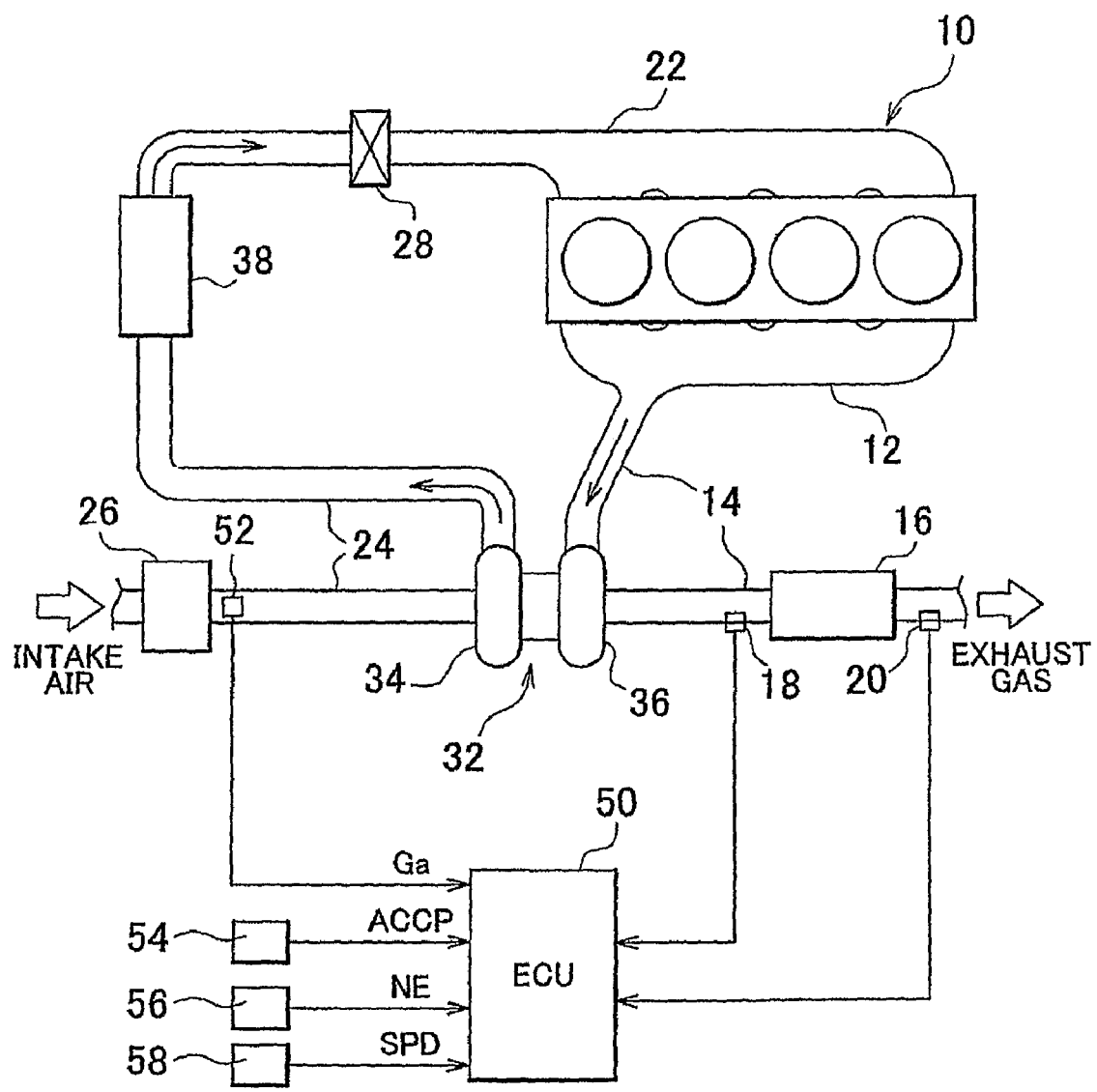
FIG. 1 is a view showing a system configuration according to the first embodiment of the invention.

Hereinafter, embodiments of the invention will be described with reference to the drawings. In the drawings, common elements are denoted by the same reference numerals and their descriptions are not repeated.

FIG. 1 is a view schematically showing the configuration of an internal combustion engine 10 incorporating a control apparatus according to the first embodiment of the invention. The internal combustion engine 10 (hereinafter, simply referred to as "engine 10") is a spark-ignition four-stroke engine. Referring to FIG. 1, an exhaust manifold 12 through which the exhaust gases from the respective cylinders are collected, is connected to the exhaust side of the engine 10. An exhaust pipe 14 is connected to the outlet of the exhaust manifold 12. An exhaust emission control catalyst 16 is provided midway on the exhaust pipe 14. An air-fuel ratio sensor 18 that detects the air-fuel ratio of exhaust gas is provided upstream of the exhaust emission control catalyst 16 in the exhaust pipe 14. More specifically, the air-fuel ratio sensor 18 measures the oxygen concentration in exhaust gas and detects the air-fuel ratio of the exhaust gas based on the measured oxygen concentration. Further, in the exhaust pipe 14, an oxygen sensor 20 is provided downstream of the exhaust emission control catalyst 16. The oxygen sensor 20 detects whether the oxygen concentration in exhaust gas is higher or lower than a reference value.

On the other hand, an intake manifold 22 through which intake air is distributed to the respective cylinders is connected to the intake side of the engine 10. An intake pipe 24 via which air is drawn from the atmosphere into the intake manifold 22 is connected to the inlet of the intake manifold 22. An air cleaner 26 is provided at the inlet of the intake pipe 24. Further, in the intake pipe 24, an air-flow meter 52 that detects an intake air amount Ga is provided immediately downstream of the air cleaner 26, and a throttle valve 28 is provided upstream of the intake manifold 22.

A turbocharger 32 is provided upstream of the throttle valve 28 in the intake pipe 24. The turbocharger 32 has a compressor 34 and a turbine 36. The turbine 36 is provided in the portion of the exhaust pipe 14 between the exhaust manifold 12 and the exhaust emission control catalyst 16. The compressor 34 and the turbine 36 are coupled with each other via a coupling shaft, and the compressor 34 is driven by the energy of exhaust gas that is transferred via the turbine 36. An intercooler 38 that cools the air compressed by the compressor 34 is provided downstream of the compressor 34 in the intake pipe 24.

An ECU (Electronic Control Unit) 50 governs the overall control of the engine 10. The throttle valve 28 and various actuators, not shown in the drawings, are connected to the output portion of the ECU 50. On the other hand, various sensors, such as the airflow meter 52, an accelerator operation amount sensor 54, an engine speed sensor 56, and a vehicle speed sensor 58, are connected to the input portion of the ECU 50. Thus, the intake air amount Ga (g/s) input from the airflow meter 52, an engine speed NE (rpm) input from the engine speed sensor 56, an accelerator operation amount ACCP (%) input from the accelerator operation amount sensor 54, and a vehicle speed SPD (m/s) input from the engine speed sensor 56 are all used as parameters for engine control. Using such parameters, the ECU 50 controls the respective components on corresponding control programs.

Figure 2:
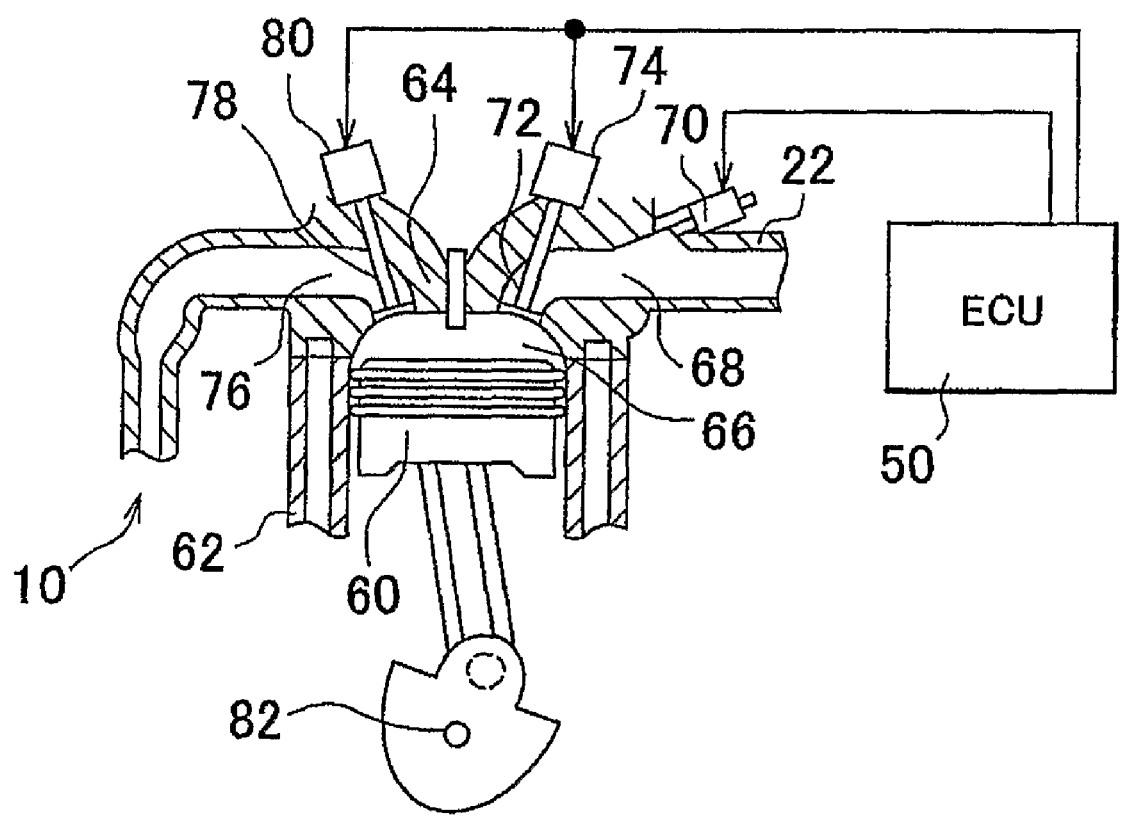
FIG. 2 is a view showing a cross section of one of the cylinders of an engine incorporating the system shown in FIG. 1.

FIG. 2 is a view showing a cross section of one of the cylinders of the engine 10. Hereinafter, the engine 10 will be described in more detail with reference to FIG. 2. Referring to FIG. 2, the engine 10 has a cylinder block 62 in which pistons 60 are disposed and a cylinder head 64 mounted on the cylinder block 62. Spaces where are encompassed by the inner face of the cylinder block 62, the inner face of the cylinder head 64, and the top faces of the respective pistons 60 form combustion chambers 66.

Injectors 70 that inject fuel into respective intake ports 68 are provided at the intake manifold 22. Intake valves 72 that control the communication between the intake ports 68 and the combustion chambers 66 are provided at the boundaries between the intake ports 68 and the combustion chambers 66. Further, the engine 10 is equipped with an intake valve timing control apparatus 74 that variably controls the valve timing of the intake valves 72. On the other hand, exhaust valves 78 that control the communication between exhaust ports 76 and the combustion chambers 66 are provided at the boundaries between the exhaust ports 76 and the combustion chambers 66. Further, the engine 10 is equipped with an exhaust valve timing control apparatus 80 that variably controls the valve timing of the exhaust valves 78. In the first embodiment, variable-valve timing mechanisms (hereinafter, simply referred to as "VVTs") are employed on the intake valve timing control apparatus 74 and the exhaust valve timing control apparatus 80. VVTs change the phase angle of the camshaft (not shown in the drawings) with respect to the crankshaft 82, and therefore advance or retard the valve timing while maintaining the cam duration (i.e., opening angle of the intake or exhaust valve) constant. In the following description, the intake valve timing control apparatus 74 and the exhaust valve timing control apparatus 80 will be referred to as "intake-side VVT 74" and "exhaust-side VVT 80", respectively. The VVTs 74 and 80 are both connected to the ECU 50.

Next, the operation of the control apparatus of the first embodiment will be described with reference to FIG. 3. According to the control apparatus of the first embodiment, the valve-overlap duration may be increased by controlling the drive of the intake-side VVT 74 based on the various operation conditions of the engine 10. That is, as the intake-side VVT 74 advances the phase angle of the camshaft (CA, i.e., the crank angle), which will hereinafter be referred to as "VVT value", the valve timing for the intake valves 72 may be advanced while maintaining the cam duration constant, whereby the valve-overlap duration increases. Note that the valve-overlap duration may be changed using the exhaust-side VVT 80 instead of the intake-side VVT 74 or using both of them.

Hereinafter, the control of the VVT value of the intake-side VVT 74 in a negative pressure region will be described. FIG. 3 illustrates how the VVT value of the intake-side VVT 74 is changed with respect to an engine load rate kl when the engine speed NE of the engine 10 is constant (e.g., NE=2000 rpm). Referring to FIG. 3, in the negative pressure region in which the turbocharger 32 is not operating, during an extremely low load operation (e.g., idling), the aforementioned process for increasing the valve-overlap duration using the intake-side VVT 74 is not performed, and therefore the amount of combusted gas that flows back to the intake ports 68 and the combustion chambers 66 decreases. As a result, the combustion progresses in a stable manner and thus the fuel economy improves accordingly.

However, when the valve-overlap duration is short, the influence of pumping loss increases as the engine load increases, and therefore the fuel economy decreases accordingly. To counter this, as shown in FIG. 3, in the negative pressure region, the VVT value of the VVT 74 is gradually advanced the valve timing of the intake valves 72 such that the larger the required engine load, the longer the valve-overlap duration. As a result, the pumping loss decreases and thus the fuel economy improves. Further, because the amount of combusted gas remaining in each combustion chamber 66 increases as the valve-overlap duration increases, the amount of NOx that is produced from fuel combustion decreases, that is, the amount of harmful exhaust emissions decreases.

Next, the control of the VVT value of the intake-side VVT 74 in the supercharging region will be described. As mentioned earlier, the engine 10 of the first embodiment is provided with the turbocharger 32. The turbocharger 32 is activated in response to the high engine load, which exceeds a reference level α shown in the chart of FIG. 3, whereby the operation region of the engine 10 shifts to the aforementioned supercharging region in which the intake passage pressure is positive. As in the case of the foregoing negative pressure region, when the engine 10 is operating in the supercharging region, if the VVT value of the VVT 74 is changed so as to advance the valve timing of the intake valves 72 for the purpose of increasing the valve-overlap duration as indicated by the dashed curve in FIG. 3, injected fuel and intake air flow out to the exhaust ports 76 without being combusted, which leads to an increase in the amount of exhaust emissions. That is, if intake air flows out to the exhaust ports 76 without being used for combustion, the combustion air-fuel ratio in each combustion chamber 6 becomes fuel-rich. However, because the air-fuel ratio feedback control is executed based on the exhaust gas air-fuel ratio measured by the air-fuel ratio sensor 18, that is, because the exhaust gas air-fuel ratio measured by the air-fuel ratio sensor is influenced by the intake air that has flown out to the exhaust ports without being used for combustion, the fuel-rich combustion is continued, and it reduces the fuel efficiency and the emission control efficiency of the exhaust emission control catalyst 16, leading to an increase in the amount of harmful exhaust emissions.

Further, if injected fuel flows out to the exhaust ports 76 without being combusted, the exhaust gas air-fuel ratio measured by the air-fuel ratio sensor 18 indicates a lean air-fuel ratio, and therefore the fuel injection amount is increased by the air-fuel ratio feedback control, and this causes an error of the air-fuel ratio learning value and an increase in the amount of harmful exhaust emissions.

Figure 3:
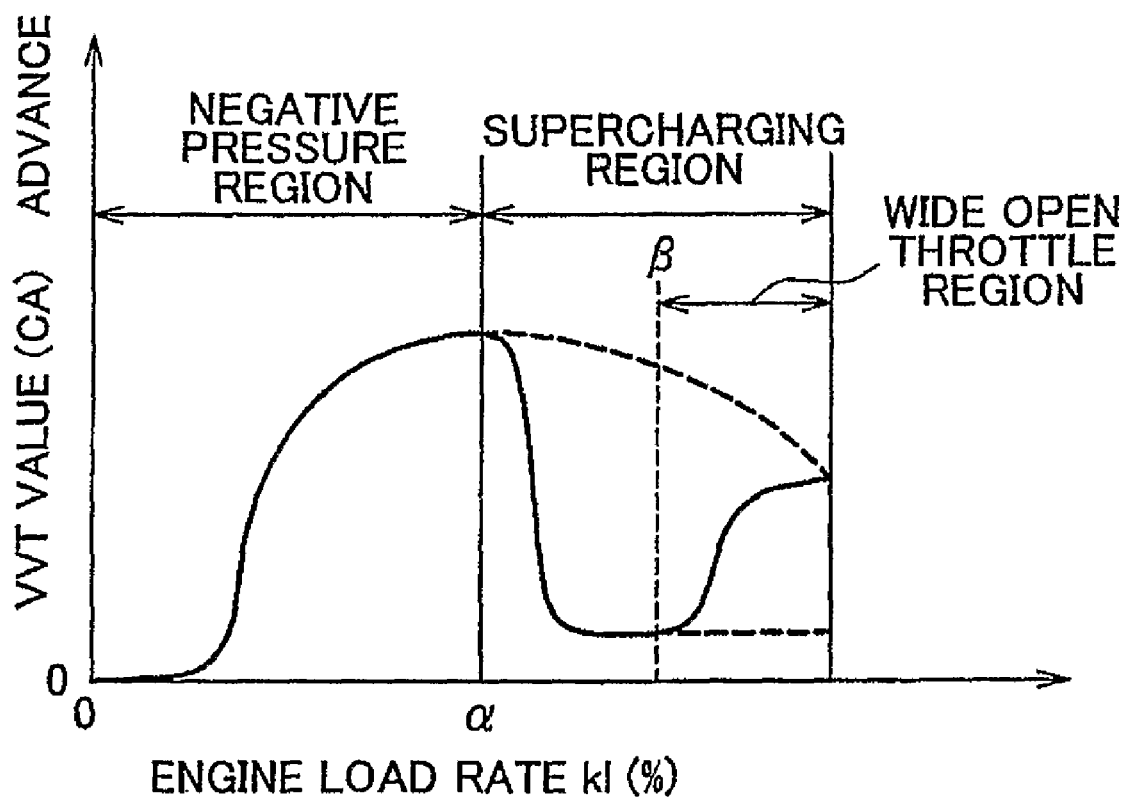
FIG. 3 is a chart illustrating how the VVT value is changed with respect to the engine load rate when the engine speed remains constant.

In view of the issue described above, in the supercharging region, the valve-overlap duration is reduced by retarding the valve timing of the intake valves 72 as indicated by the solid curve in FIG. 3. As such, the outflow of intake air and injected fuel may be effectively suppressed, whereby an increase in the amount of harmful exhaust emissions is suppressed and the fuel economy improves.

As described above, the outflow of intake air and injected fuel may be effectively suppressed by reducing the valve-overlap duration in the supercharging region. However, if the valve-overlap duration is thus reduced, it makes it difficult to satisfy requirements for high engine load. That is, when the valve timing of the intake valves 72 is retarded in accordance with the retardation of the VVT value of the VVT 74, the intake air drawn into each combustion chamber 66 partially flows back to the intake port 68, and the packing efficiency of the combustion chamber 66 decreases accordingly. Therefore, when the required engine load is close to the full engine load (i.e., the engine load corresponding to the maximum torque), the engine output may not be increased up to the level corresponding to the required engine load even if the throttle valve 28 is fully opened.

In view of the issue described above, in the first embodiment, the intake-side VVT 74 is controlled so as to advance the valve timing for closing the intake valves 72 in an operation region near the approximate full engine load (e.g., the operation region in the range of 80 to 100% of the maximum torque), which will be referred to "WOT region". More specifically, when the VVT value of the VVT 74 is advanced, the valve timing of the intake valves 72 is advanced. As such, the valve timing for closing the intake valves 72 is advanced in the WOT region, and therefore the packing efficiency of the combustion chamber 66 may increase, and the engine output may be suppressed from weakening even when the required engine load is high. As such, by increasing the valve-overlap duration in the WOT region, it is possible to efficiently suppress an increase in the amount of harmful exhaust emissions while ensuring that the engine output.

Because the engine output cannot satisfy the required engine load in the WOT region when the valve-overlap duration is reduced in the supercharging region, it cannot be determined whether the engine 10 is operating in the WOT region, based on the engine load rate kl. Therefore, it may be determined whether the engine 10 is operating in the WOT region, based on the engine speed NE and the throttle opening degree TA, for example, that are obtained from the required engine load.

Figure 4:
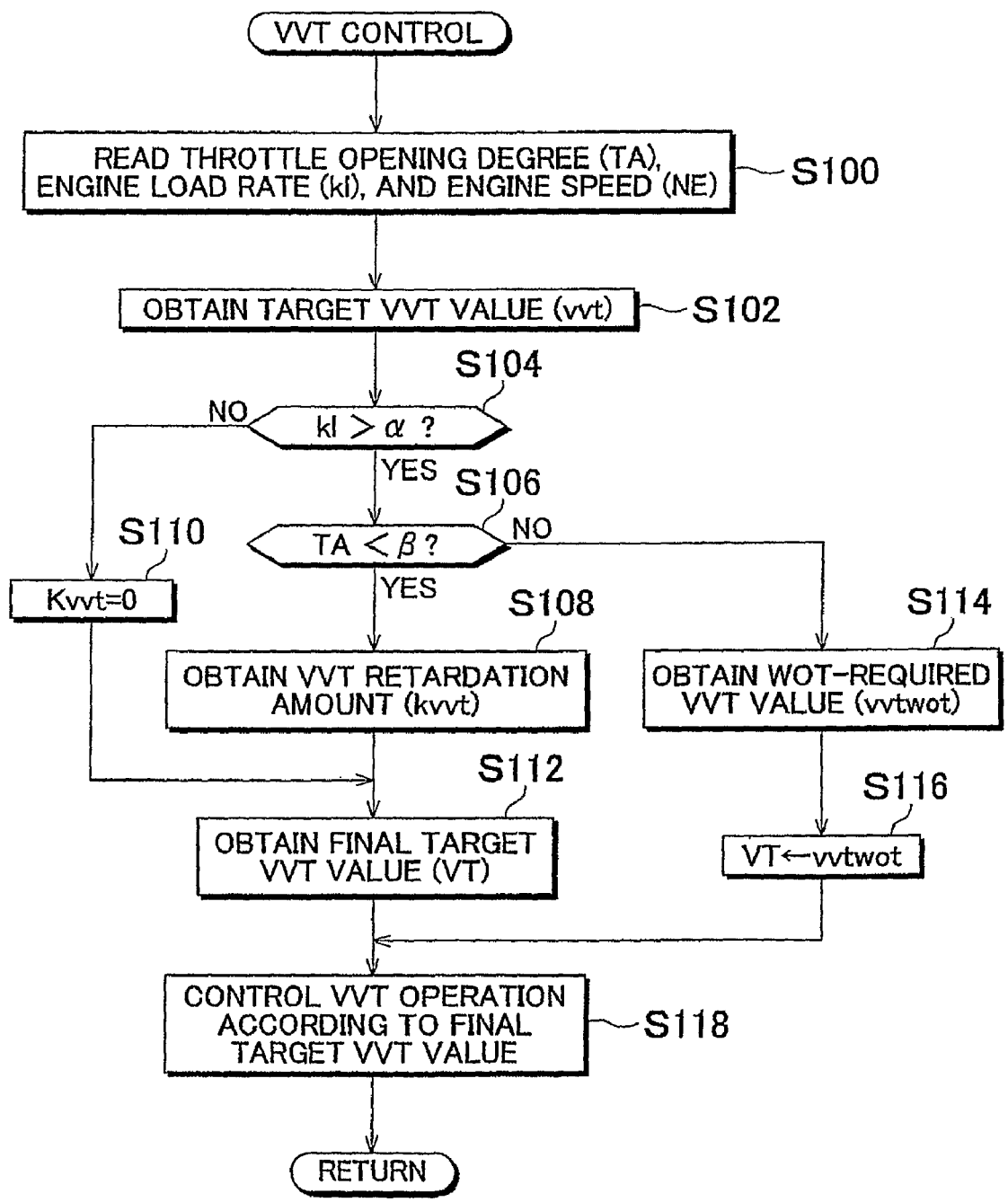
FIG. 4 is a flowchart illustrating a variable valve timing control routine executed in the first embodiment of the invention.

Next, the control routine executed in the first embodiment will be described in detail with reference to FIG. 4 to FIG. 8. FIG. 4 is a flowchart illustrating a VVT control routine executed by the ECU 50.

In the control routine illustrated in FIG. 1, the ECU 50 first reads the throttle opening degree TA, the engine load rate kl, and the engine speed NE (Step 100). In step 100, more specifically, the ECU 50 reads the values calculated based on the signals, or the like, that are obtained from the airflow meter 52, the accelerator operation amount sensor 54, the engine speed sensor 56, and the vehicle speed sensor 58.

Figures 5, 6:
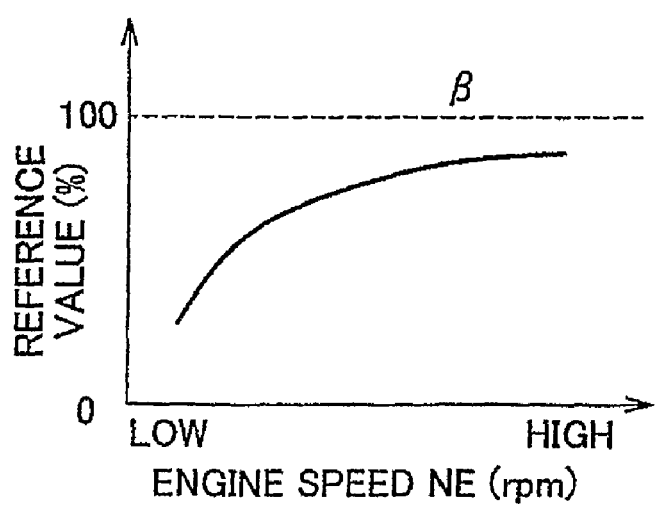
FIG. 5 is a table according to which a target VVT value is calculated using a the engine load rate and the engine speed as parameters.
FIG. 6 is a map according to which a reference value β is calculated using the engine speed as a parameter.

Next, the ECU 50 calculates a target VVT value (vvt), which is an target amount of advancing the intake-side VVT 74 (Step 102). FIG. 5 is a table that is stored in the ECU 50 and used to calculate the target VVT value (vvt). That is, the table is formulated to calculate the target VVT value (vvt) corresponding to the engine speed NE and the engine load rate kl read in step 100.

Next, the ECU 50 determines whether the engine 10 is operating in the supercharging region (step 104). In step 104, more specifically, the ECU 50 determines whether the engine load rate kl read in step 100 is greater than a reference value α. The reference value α is a predetermined value to determine whether the engine 10 is operating in the supercharging region, and it is set to, for example, 80% with respect to the full load of the engine.

If it is determined in step 104 that the engine load rate kl is greater than the reference value α, the ECU 50 then proceeds to step 106 and determines whether the engine 10 is operating in the WOT region. In step 106, more specifically, the ECU 50 determines whether the throttle opening degree TA read in step 100 is smaller than a reference value β.

FIG. 6 is a map that is stored in the ECU 50 and used to calculate the reference value β. In step 106, the reference value β is calculated using this map. When the engine speed NE is low, the intake air amount as large as being normally obtained at the maximum level of the throttle opening degree TA may be ensured even if the actual throttle opening degree TA is not the maximum level (i.e., 100%). Therefore, the map shown in FIG. 5 is formulated such that the reference value β is set to a smaller value as the engine speed NE is decreased.

If it is determined in step 106 that the throttle opening degree TA is smaller than the reference value β, it indicates that the engine 10 is operating in a region of the supercharging region other than the WOT region, and therefore the ECU 50 proceeds to step 108. In step 108, the ECU 50 calculates a VVT retardation amount (kvvt), which indicates an amount of retarding the valve timing required for suppressing backflow of the intake air. FIG. 7 is a table that is stored in the ECU 50 and used to calculate the VVT retardation amount (kvvt). More specifically, the ECU 50 calculates, using the table shown in FIG. 7, the value of the VVT retardation amount (kvvt) corresponding to the engine speed NE and the engine load late kl read in step 100.

On the other hand, if it is determined in step 104 that the engine load rate is equal to or lower than the reference value α, the ECU 50 then proceeds to step 110 and zeros the VVT retardation amount (kvvt).

Next, in step 112, the ECU 50 calculates a final target VVT value (VT). More specifically, in step 112, the ECU 50 calculates the final target VVT value (VT) by subtracting the VVT retardation amount (kvvt) calculated in step 108 or step 110 from the target VVT value (vvt) calculated in step 102 as in the expression (1) shown below.

$$VT = vvt - kvvt \tag{1}$$

On the other hand, if it is determined in step 106 that the throttle opening degree TA is equal to or greater than the reference value β, it indicates that the engine 10 is operating in the WOT range, and therefore the ECU 50 proceeds to step 114. In step 114, the ECU 50 calculates a WOT-required VVT value (vvtwot), which indicates an VVT advance amount by which to operate the intake-side VVT 74 to advance the valve timing of the intake valves 72 in the WOT region. FIG. 8 shows a table that is stored in the ECU 50 and used to calculate the WOT-required VVT value (vvtwot). In step 114, the ECU 50 calculates, using the table shown in FIG. 8, the VVT advance amount in WOT region (vvtwot) corresponding to the engine speed NE read in step 100.

Then, in step 116, the ECU 50 calculates the final target VVT value (VT) for the WOT region. In step 116, more specifically, the ECU 50 sets the final target VVT value (VT) equal to the WOT-required VVT value (vvtwot) calculated in step 114.

Then, in step 118, the ECU 50 controls the intake-side VVT 74 according to the final target VVT value (VT). More specifically, the ECU 50 controls the intake-side VVT 74 based on the final target VVT value (VT) calculated in step 112 or step 116, after which the ECU 50 finishes the cycle of this routine.

According to the first embodiment, as described above, the final target VVT value (VT) is differently calculated for each operation region of the engine 10, that is, for the negative pressure region, the supercharging region, and the WOT region. As such, the pumping loss at the engine 10 in the negative pressure region may decrease, and the outflow of injected fuel and intake air in the supercharging region and the backflow of intake air in the WOT region may be effectively suppressed. Thus, it is possible to suppress an increase in the amount of harmful exhaust emissions while ensuring the engine output satisfying the required high engine load.

In the first embodiment, as described above, whether the engine 10 is operating in the supercharging region is determined by comparison between the engine load rate kl and the reference value α. However, the determination as to the supercharging region is not limited to this. That is, it may be determined in various other manners whether the engine 10 is operating in the supercharging region. For example, the engine 10 may be determined to be operating in the supercharging region when the intake passage pressure that may either be estimated or measured is positive. Further, whether the engine 10 is operating in the supercharging region may be estimated based on various operation conditions, such as the required engine load.

Further, in the first embodiment, as described above, whether the engine 10 is operating in the WOT region is determined by comparison between the calculated throttle opening degree TA and the reference value β that is set using the engine speed NE as a parameter. However, the determination as to the WOT region is not limited to this. That is, whether the engine 10 is operating in the WOT region may be determined using an operation parameters other than the throttle opening degree TA, provided that the parameters are calculated from the required engine load, or the like.

Further, in the first embodiment, as described above, variable valve timing mechanisms 74, 80 are used as the intake-valve timing control apparatus and the exhaust-valve timing control apparatus. The valve timing control apparatuses are not limited to such variable valve timing mechanisms 74, 80. Alternatively, solenoid valve mechanisms may be used as the valve timing control apparatuses.

Further, in the first embodiment, as described above, when calculating the final target VVT value (VT), the target VVT value (vvt) is first calculated using the table shown in FIG. 5, and then if it has been determined that the engine 10 is operating in the supercharging region, the VVT retardation amount (kvvt) is calculated using the table of FIG. 7, and then the calculated VVT retardation amount (kvvt) is subtracted from the target VVT value (vvt) as shown in the expression (1), whereby the final target VVT value (VT) is calculated.

However, the method for calculating the final target VVT value (VT) is not limited to this. Alternatively, the table shown in FIG. 5 may incorporate the VVT retardation amount (kvvt) that is defined in the table of FIG. 7. In this case, the final target VVT value (VT) may also be calculated using the table of FIG. 5 incorporating the VVT retardation amount (kvvt).

More specifically, the table of FIG. 5 incorporating the VVT retardation amount (kvvt) may be alternatively used in step 102 of the routine illustrated in FIG. 4. In this case, the VVT retardation amount (kvvt) is incorporated in the target VVT value (vvt) calculated in step 102 and therefore the process in step 104 may be unnecessary.

In the first embodiment, the VVTs 74, 80 may be regarded as "valve-drive mechanism" of the invention, and the supercharging region may be regarded as "first supercharging region" of the invention, and the WOT region may be regarded as "second supercharging region". Further, being adapted to execute the processes of step 112 and step 114, the ECU 50 may be regarded as "target valve timing setting means" of the invention. Further, being adapted to execute the process of step 118, the ECU 50 may be regarded as "valve-drive mechanism controlling means" of the invention.

In the first embodiment described above, further, the ECU 50 adapted to execute the process of step 106 may be regarded as "second supercharging region determining means" of the invention.

Next, the second embodiment of the invention will be described with reference to FIG. 9. The hardware configuration of the control apparatus according to the second embodiment is the same as shown in FIG. 1 and FIG. 2, and the ECU 50 of the control apparatus of the second embodiment is adapted to execute the control routine illustrated in FIG. 9, as will later be described in detail.

The control apparatus of the second embodiment executes air-fuel ratio feedback control and air-fuel ratio learning process. More specifically, the control apparatus executes main feedback control in which the amount of fuel injected from each injector 70 is controlled based on the output of the air-fuel ratio sensor 18 such that the actual air-fuel ratio equals the target air-fuel ratio.

During the main feedback control, the air-fuel ratio learning process is executed based on the deviation between the actual air-fuel ratio and the target air-fuel ratio, to eliminate an air-fuel ratio error that constantly occur. Assuming that the main feedback control amount even includes a constant error, it takes a long time until the main feedback control amount is updated to an appropriate value. Thus, the time required for updating the main feedback control amount to the appropriate value may be significantly reduced by transferring such constant errors through the air-fuel ratio learning process.

In the air-fuel ratio learning process, constant errors that are factored in various elements related to the execution of the main feedback control are learned as learning values. In the air-fuel ratio learning process, more specifically, the average value of the main feedback control amount is replaced, at an appropriate time, with a main feedback learning amount.

Further, even in the case where the main feedback control and the air-fuel ratio learning process are both ongoing, the air-fuel ratio may deviate to a rich air-fuel ratio or a lean air-fuel ratio. If such air-fuel ratio deviations continue, the exhaust emission control catalyst 16 may not control emissions such as $NO_x$, and thus the amount of harmful exhaust emissions may increase. To cope with this, in the second embodiment, a sub-feedback control is executed so as to complement the main feedback control. The sub-feedback control is executed based on the signals output from the oxygen sensor 20 such that the air-fuel ratio of exhaust gas passing through the exhaust emission control catalyst 16 equals the target air-fuel ratio.

Also during the sub-feedback control, the air-fuel ratio learning process is executed as during the main feedback control. As such, as long as the air-fuel ratio feedback control and the air-fuel ratio learning process are properly executed, the actual air-fuel ratio may be constantly controlled to near the target air-fuel ratio, and thus an increase in the amount of harmful exhaust emissions may be suppressed.

Hereinafter, the control of the VVT value of the intake-side VVT 74 will be described. In the second embodiment, the same VVT control as that of the first embodiment is executed. More specifically, when the engine 10 is operating at a low engine speed in the supercharging region, the intake-side VVT 74 is controlled to reduce the valve-overlap duration based on the calculated final target VVT value (VT). As a result, the outflow of injected fuel and intake air in the supercharging region may be effectively suppressed, and therefore an increase in the amount of harmful exhaust emissions may be suppressed.

However, response delays or operation failures of the intake-side VVT 74 may occur during the VVT control, and it causes a deviation between the final target VVT value (VT) and the actual VVT value. In such a case, because the VVT control is not accurately performed, the actual air-fuel ratio may become inappropriate, and thus the air-fuel ratio learning may become improper.

In view of this, in the second embodiment, execution of the air-fuel ratio learning process is prohibited when the VVT control is not accurately performed while the engine 10 is operating at a low engine speed in the supercharging region. As a result, improper air-fuel ratio learning may be avoided, and thus an increase in the amount of harmful exhaust emissions caused by inappropriate feedback control, may be effectively suppressed.

Next, the control routine that is executed in the second embodiment will be described in detail with reference to FIG. 9. FIG. 9 is a flowchart illustrating a VVT control routine executed by the ECU 50.

Figure 9:
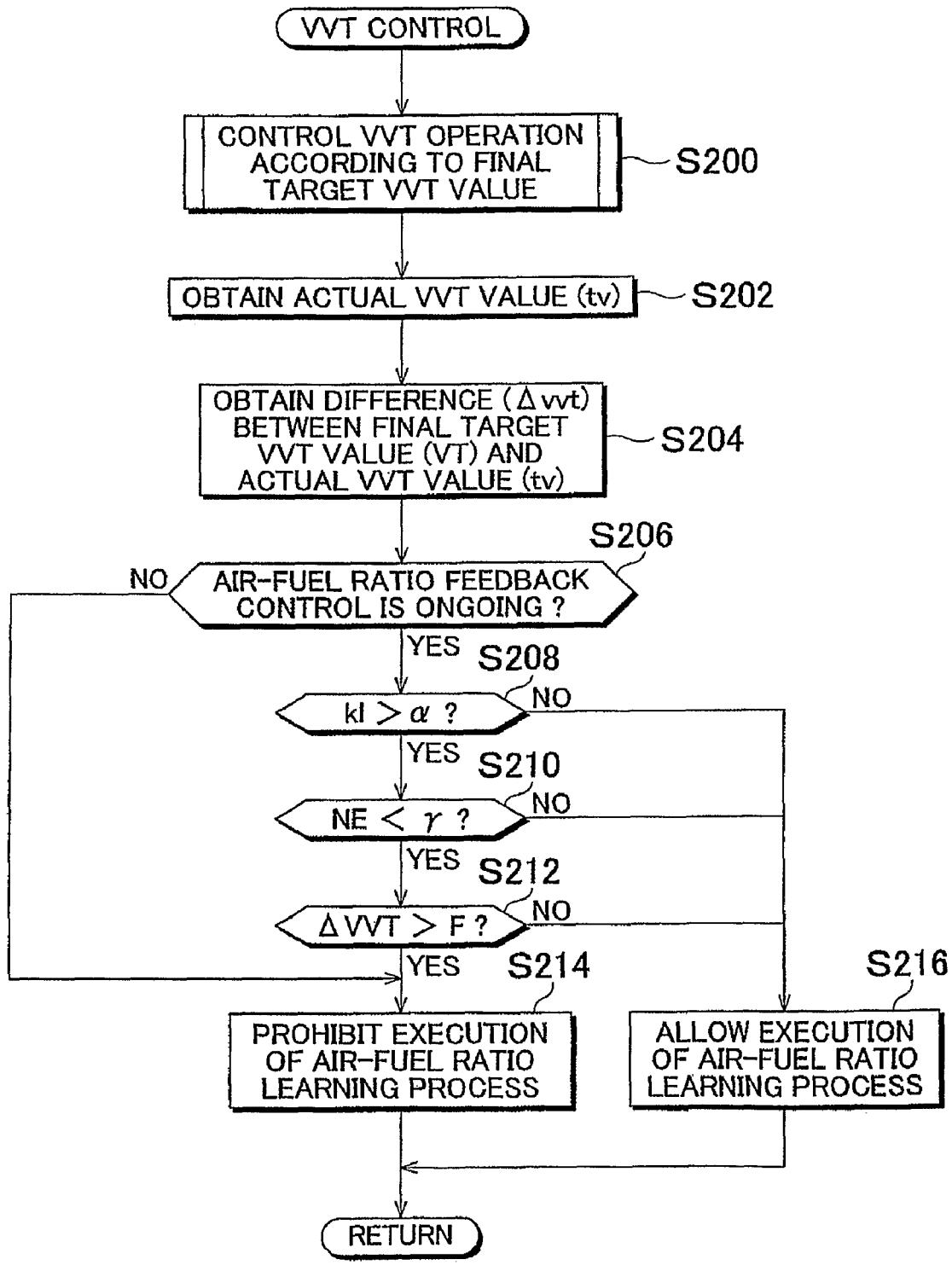
FIG. 9 is a flowchart illustrating a variable valve timing control routine executed in the second embodiment of the invention.

In the routine illustrated in FIG. 9, the ECU 50 first controls the intake-side VVT 74 according to the final target VVT value (VT) (step 200). More specifically, the ECU 50 controls the intake-side VVT 74 based on the final target VVT value (VT) that is calculated through the processes of step 100 to step 118 of the routine illustrated in FIG. 4.

Then, the ECU 50 obtains an actual VVT value (tv) (step 202). Then, the ECU 50 calculates the deviation (Δvvt) between the final target VVT value (VT) and the actual VVT value (tv) (step 204). That is, the ECU 50 calculates the deviation between the final target VVT value (VT) calculated in step 200 and the actual VVT value (tv) calculated in step 202.

Next, the ECU 50 determines whether the air-fuel ratio feedback control is ongoing (step 206). When an open-loop control is being performed such as when the engine is being started up and when the engine load is high (i.e., "NO" in step 206), there is a possibility that the air-fuel ratio become inappropriate, and therefore execution of the air-fuel ratio learning process is prohibited (step 214). More specifically, at this time, execution of the main feedback learning and sub-feedback learning are both prohibited.

On the other hand, if it is determined in step 206 that the air-fuel ratio feedback control is ongoing, the ECU 50 then determines whether the engine 10 is operating in the supercharging region (step 208). More specifically, in step 208, the ECU 50 executes the same process as that in step 104 of the routine shown in FIG. 4.

If it is determined in step 208 that the engine load rate kl is equal to or lower than the reference value α, it indicates that the engine 10 is operating in the negative pressure region, and thus the ECU 50 proceeds to step 216 and allows execution of the air-fuel ratio learning process. On the other hand, if it is determined in step 208 that the engine load rate kl is higher than the reference value α, the ECU 50 then proceeds to step 210 and determines whether the engine speed NE is within a given low engine speed range. More specifically, in step 210, the ECU 50 determines whether the engine speed NE read in step 200 is lower than a reference value γ that has been set so as to determine whether the engine speed NE is within the low engine speed range.

If it is determined in step 210 that the engine speed NE is equal to or higher than the reference value γ, the ECU 50 then proceeds to step 216 and allows execution of the air-fuel ratio learning process. On the other hand, if it is determined in step 210 that the engine speed NE is lower than the reference value γ, the ECU 50 then proceeds to step 212 and determines whether the deviation (Δvvt) between the final target VVT value (VT) and the actual VVT value (tv) is larger than a reference value F. That is, in step 212, the ECU 50 determines whether the deviation (Δvvt) is within an allowable range as a response delay of the VVT control. If the deviation (Δvvt) is equal to or smaller than the reference value F, it indicates that the deviation (Δvvt) is within the allowable range. In this case, therefore, the ECU 50 proceeds to step 216 and allows execution of the air-fuel ratio learning process.

On the other hand, if it is determined in step 212 that the deviation (Δvvt) is greater than the reference value F, it indicates that the deviation (Δvvt) is out of the allowable range and there is a possibility that the air-fuel ratio become inappropriate. In this case, therefore, the ECU 50 proceeds to step 214 and prohibits execution of the air-fuel ratio learning process.

According to the second embodiment, as described above, when a response delay exceeding the allowable range occurs in the VVT control during the air-fuel ratio feedback control while the engine 10 is operating at a low engine speed in the supercharging region (i.e., while the engine 10 is operating in the first supercharging region), execution of the air-fuel ratio learning process may be prohibited. As such, improper air-fuel ratio learning may be prevented, and thus an increase in the amount of harmful exhaust emissions caused by improper feedback control, may be effectively suppressed.

In the second embodiment, whether the engine 10 is operating in the supercharging region is determined by comparison between the engine load rate kl and the reference value α. However, as described in the first embodiment, the engine 10 may be determined to be operating in the supercharging region when the intake passage pressure that may either be estimated or measured is positive. Further, whether the engine 10 is operating in the supercharging region may be estimated based on various operation conditions, such as the required engine load.

Further, in the second embodiment, variable valve timing mechanisms 74, 80 are used as the intake-valve timing control apparatus and the exhaust-valve timing control apparatus. However, as described in the first embodiment, solenoid valve mechanisms may be alternatively used as the valve timing control apparatuses.

In the second embodiment described above, being adapted to execute the process of step 202, the ECU 50 may be regarded as "actual valve timing obtaining means" of the invention. Further, being adapted to execute the process of step 214, the ECU 50 may be regarded as "air-fuel ratio learning prohibiting means" of the invention. Further, being adapted to execute the process of step 216, the ECU 50 may be regarded as "air-fuel ratio learning controlling means" of the invention.

While the invention has been described with reference to embodiments thereof, it is to be understood that the invention is not limited to the described embodiments or constructions. To the contrary, the invention is intended to cover various modifications and equivalent arrangements. In addition, while the various elements of the embodiments are shown in various combinations and configurations, other combinations and configurations, including more, less or only a single element, are also within the spirit and scope of the invention.

The invention claimed is:

1. A control apparatus for an internal combustion engine having a supercharging device comprising:
   a valve-drive mechanism that variably controls a valve timing for at least intake valves;
   a target valve timing setting unit that sets a target valve timing for at least the intake valves in accordance with an operation condition of the engine in a low engine speed range; and
   a valve-drive mechanism controlling unit that controls the valve-drive mechanism based on the target valve timing, wherein the target valve timing setting unit sets:
   (a) a first target valve timing such that a valve-overlap duration, during which both an intake valve and an exhaust valve are open, is provided when the engine is operating in a negative pressure region where the supercharging device is not being driven at a sufficient rate to produce a positive intake pressure,
   (b) a second target valve timing such that the valve-overlap duration when the engine is operating in a first supercharging region of supercharging regions, where the supercharging device is being driven, is reduced compared to the valve-overlap duration in the negative pressure region preceding the first supercharging region, and
   (c) a third target valve timing such that the valve-overlap duration when the engine is operating in a second supercharging region, where a higher engine load than an engine load of the first supercharging region, is increased compared to the valve-overlap duration in the first supercharging region preceding the second supercharging region.

2. The control apparatus according to claim 1, wherein the target valve timing setting unit sets the first target valve timing in the negative pressure region such that the valve-overlap duration is increased as a required load of the engine increases.

3. The control apparatus according to claim 2, wherein the first target valve timing in the negative pressure region is advanced to make the valve-overlap duration longer as the required load of the engine increases.

4. The control apparatus according to claim 1, wherein the engine is determined to be operating in the supercharging regions when a pressure in an intake passage of the engine is positive.

5. The control apparatus according to claim 1, wherein the engine is determined to be operating in the supercharging regions when a load rate of the engine exceeds a first reference value.

6. The control apparatus according to claim 1, wherein the target valve timing setting unit sets the second target valve timing in the first supercharging region such that the valve-overlap duration is reduced as the engine speed is decreased.

7. The control apparatus according to claim 1, further comprising:
- a second supercharging region determining unit that determines that the engine is operating in the second supercharging region when at least an opening degree of a throttle valve in the engine is greater than a second reference value; and
- a second reference value calculating unit that calculates the second reference value such that the second reference value is reduced as the engine speed is decreased.

8. The control apparatus according to claim 1, wherein the engine is determined to be operating in the second supercharging region when an approximate full load of the engine is required.

9. The control apparatus according to claim 1, further comprising:
- an actual valve timing obtaining unit that obtains an actual valve timing of at least the intake valves in the supercharging regions;
- an air-fuel ratio learning control unit that executes
  - (a) an air-fuel ratio feedback control based on a deviation between a target air-fuel ratio and an actual air-fuel ratio, thereby causing an air-fuel ratio of air-fuel mixtures which are supplied to the engine to be equal to the target air-fuel ratio, and
  - (b) an air-fuel ratio learning process for minimizing an error of the air-fuel ratio during the air-fuel ratio feedback control; and
- an air-fuel ratio learning prohibiting unit that prohibits the execution of the air-fuel ratio learning process when a deviation between the target valve timing and the actual valve timing exceeds a predetermined amount.

10. The control apparatus according to claim 1, wherein the valve-drive mechanism is a variable valve timing mechanism.

11. The control apparatus according to claim 1, wherein the valve-drive mechanism is a solenoid valve mechanism.

12. A control method for an internal combustion engine having a supercharging device and a valve-drive mechanism that variably controls the valve timings for at least intake valves, comprising:
- setting a target valve timing for at least the intake valves in accordance with an operation condition of the engine in a low engine speed range;
- controlling the valve-drive mechanism based on the target valve timing;
- setting a first target valve timing such that a valve-overlap duration, during which both an intake valve and an exhaust valve are open, is provided when the engine is operating in a negative pressure region where the supercharging device is not being driven at a sufficient rate to produce a positive intake pressure;
- setting a second target valve timing such that the valve-overlap duration when the engine is operating in a first supercharging region of supercharging regions, where the supercharging device is being driven, is reduced compared to the valve-overlap duration in the negative pressure region preceding the first supercharging region; and
- setting a third target valve timing such that the valve-overlap duration when the engine is operating in a second supercharging region, where a higher engine load than an engine load of the first supercharging region, is increased compared to the valve-overlap duration in the first supercharging region preceding the second supercharging region.

13. The control apparatus according to claim 1, wherein the target valve timing is set based on the load of the engine when the speed of the engine is constant.

14. The control method according to claim 12, wherein the target valve timing is set based on the load of the engine when the speed of the engine is constant.

15. The control apparatus according to claim 1, wherein the second target valve timing is set by the target valve timing setting unit such that the valve-overlap duration when the engine is operating in a first supercharging region of supercharging regions, where the supercharging device is being driven at a higher engine load than an engine load of the negative pressure region, is reduced compared to the valve-overlap duration in the negative pressure region preceding the first supercharging region, and
wherein the third target valve timing is set by the target valve timing setting unit such that the valve-overlap duration when the engine is operating in a second supercharging region, where the supercharging device is being driven at a higher engine load than an engine load of the first supercharging region, is increased compared to the valve-overlap duration in the first supercharging region preceding the second supercharging region.

* * * * *